United States Patent
Reddy et al.

(10) Patent No.: US 7,172,022 B2
(45) Date of Patent: Feb. 6, 2007

(54) CEMENT COMPOSITIONS CONTAINING DEGRADABLE MATERIALS AND METHODS OF CEMENTING IN SUBTERRANEAN FORMATIONS

(75) Inventors: B. Raghava Reddy, Duncan, OK (US); Frank Zamora, Duncan, OK (US); Philip D. Nguyen, Duncan, OK (US); Trinidad Munoz, Jr., Duncan, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 9 days.

(21) Appl. No.: 10/802,340

(22) Filed: Mar. 17, 2004

(65) Prior Publication Data

US 2005/0205258 A1 Sep. 22, 2005

(51) Int. Cl.
  *E21B 33/138* (2006.01)
  *E21B 43/14* (2006.01)
(52) U.S. Cl. .............. 166/293; 166/309; 166/313; 106/677; 106/802; 106/810; 106/820; 106/823
(58) Field of Classification Search ............... 166/292, 166/293, 309, 313; 106/677, 802, 810, 820, 106/823
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | |
| 3,784,585 A | 1/1974 | Schmitt et al. | |
| 3,828,854 A | 8/1974 | Templeton et al. | |
| 3,868,998 A | 3/1975 | Lybarger et al. | |
| 3,948,672 A | 4/1976 | Harnsberger | |
| 3,955,993 A | 5/1976 | Curtice et al. | |
| 3,960,736 A | 6/1976 | Free et al. | |
| 3,998,272 A | 12/1976 | Maly | |
| 4,169,798 A | 10/1979 | DeMartino | |
| 4,261,421 A | 4/1981 | Watanabe | |
| 4,304,298 A | 12/1981 | Sutton | |
| 4,340,427 A | 7/1982 | Sutton | |
| 4,387,769 A | 6/1983 | Erbstoesser et al. | |
| 4,470,915 A | 9/1984 | Conway | |
| 4,526,695 A | 7/1985 | Erbstoesser et al. | |
| 4,565,578 A | 1/1986 | Sutton et al. | |
| 4,694,905 A | 9/1987 | Armbruster | |
| 4,716,964 A | 1/1988 | Erbstoesser et al. | |
| 4,785,884 A | 11/1988 | Armbruster | |
| 4,809,783 A | 3/1989 | Hollenbeck et al. | |
| 4,817,721 A | 4/1989 | Pober | |
| 4,818,288 A | 4/1989 | Aignesberger et al. | |
| 4,843,118 A | 6/1989 | Lai et al. | |
| 4,848,467 A | 7/1989 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 5,082,056 A | 1/1992 | Tackett, Jr. | |
| 5,142,023 A | 8/1992 | Gruber et al. | |
| 5,159,980 A | 11/1992 | Onan et al. | |
| 5,203,834 A * | 4/1993 | Hutchins et al. ............ | 166/270 |
| 5,216,050 A | 6/1993 | Sinclair | |
| 5,247,059 A | 9/1993 | Gruber et al. | |
| 5,293,938 A | 3/1994 | Onan et al. | |
| 5,359,026 A | 10/1994 | Gruber | |
| 5,439,055 A | 8/1995 | Card et al. | |
| 5,460,226 A | 10/1995 | Lawson et al. | |
| 5,475,080 A | 12/1995 | Gruber et al. | |
| 5,484,881 A | 1/1996 | Gruber et al. | |
| 5,536,807 A | 7/1996 | Gruber et al. | |
| 5,588,488 A | 12/1996 | Vijn et al. | |
| 5,591,700 A | 1/1997 | Harris et al. | |
| 5,594,095 A | 1/1997 | Gruber et al. | |
| 5,607,905 A | 3/1997 | Dobson, Jr. et al. | |
| 5,613,558 A * | 3/1997 | Dillenbeck, III ............ | 166/293 |
| 5,688,844 A | 11/1997 | Chatterji et al. | |
| 5,738,463 A | 4/1998 | Onan | |
| 5,791,415 A | 8/1998 | Nguyen et al. | |
| 5,795,924 A | 8/1998 | Chatterji et al. | |
| 5,820,670 A | 10/1998 | Chatterji et al. | |

(Continued)

FOREIGN PATENT DOCUMENTS

EP 0 211 079 2/1987

(Continued)

OTHER PUBLICATIONS

Halliburton brochure entitled CFR-3 Cement Friction Reducer Dispersant dated 1998.

(Continued)

*Primary Examiner*—George Suchfield
(74) *Attorney, Agent, or Firm*—Craig W. Roddy; Baker Botts L.L.P.

(57) ABSTRACT

The present invention provides cement compositions that include degradable materials, and methods of using such compositions in subterranean cementing operations. An example of a method of the present invention includes: providing a cement composition that includes a hydraulic cement, and a degradable material; placing the cement composition in a subterranean formation; allowing the cement composition to set therein; and allowing the degradable material to degrade. Another example of a method of the present invention is a method of enhancing the mechanical properties of a cement composition including adding a degradable material to the cement composition and allowing the degradable material to degrade.

46 Claims, No Drawings

U.S. PATENT DOCUMENTS

| | | | |
|---|---|---|---|
| 5,849,401 A | 12/1998 | El-Afandi et al. | |
| 5,908,073 A | 6/1999 | Nguyen et al. | |
| 5,913,364 A | 6/1999 | Sweatman et al. | |
| 5,924,488 A | 7/1999 | Nguyen et al. | |
| 5,945,387 A | 8/1999 | Chatterji et al. | |
| 5,964,293 A | 10/1999 | Chatterji et al. | |
| 5,996,693 A * | 12/1999 | Heathman | 166/291 |
| 6,047,772 A | 4/2000 | Weaver et al. | |
| 6,063,738 A | 5/2000 | Chatterji et al. | |
| 6,098,711 A | 8/2000 | Chatterji et al. | |
| 6,131,661 A | 10/2000 | Conner et al. | |
| 6,143,698 A | 11/2000 | Murphey et al. | |
| 6,162,766 A | 12/2000 | Muir et al. | |
| 6,167,967 B1 | 1/2001 | Sweatman | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,234,251 B1 | 5/2001 | Chatterji et al. | |
| 6,242,390 B1 | 6/2001 | Mitchell et al. | |
| 6,258,757 B1 | 7/2001 | Sweatman et al. | |
| 6,271,181 B1 | 8/2001 | Chatterji et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,328,106 B1 | 12/2001 | Griffith et al. | |
| 6,330,917 B2 | 12/2001 | Chatterji et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 * | 5/2002 | Nguyen et al. | 166/276 |
| 6,401,817 B1 | 6/2002 | Griffith et al. | |
| 6,448,206 B1 | 9/2002 | Griffith et al. | |
| 6,485,947 B1 | 11/2002 | Rajgarhia et al. | |
| 6,508,305 B1 | 1/2003 | Brannon et al. | |
| 6,555,507 B2 | 4/2003 | Chatterji et al. | |
| 6,578,630 B2 * | 6/2003 | Simpson et al. | 166/55.8 |
| 6,593,402 B2 | 7/2003 | Chatterji et al. | |
| 6,599,863 B1 | 7/2003 | Palmer et al. | |
| 6,645,288 B1 | 11/2003 | Dargaud et al. | |
| 6,668,928 B2 | 12/2003 | Brothers | |
| 6,669,771 B2 | 12/2003 | Tokiwa et al. | |
| 6,702,023 B1 | 3/2004 | Harris et al. | |
| 6,710,019 B1 | 3/2004 | Sawdon et al. | |
| 6,763,888 B1 | 7/2004 | Harris et al. | |
| 6,817,414 B2 | 11/2004 | Lee | |
| 6,896,058 B2 | 5/2005 | Munoz, Jr. et al. | |
| 6,904,971 B2 * | 6/2005 | Brothers et al. | 166/293 |
| 6,949,491 B2 | 9/2005 | Cooke, Jr. | |
| 2001/0004936 A1 * | 6/2001 | Chatterji et al. | 166/295 |
| 2001/0016562 A1 | 8/2001 | Muir et al. | |
| 2002/0004464 A1 | 1/2002 | Nelson et al. | |
| 2002/0036088 A1 | 3/2002 | Todd | |
| 2002/0193257 A1 | 12/2002 | Lee et al. | |
| 2003/0060374 A1 | 3/2003 | Cooke, Jr. | |
| 2003/0114314 A1 | 6/2003 | Ballard et al. | |
| 2003/0130133 A1 | 7/2003 | Vallmer | |
| 2003/0134751 A1 | 7/2003 | Lee et al. | |
| 2003/0221831 A1 | 12/2003 | Reddy et al. | |
| 2003/0221832 A1 | 12/2003 | Reddy et al. | |
| 2003/0234103 A1 | 12/2003 | Lee | |
| 2004/0014607 A1 | 1/2004 | Sinclair et al. | |
| 2004/0040706 A1 | 3/2004 | Hossaini et al. | |
| 2004/0094300 A1 | 5/2004 | Sullivan et al. | |
| 2004/0138068 A1 | 7/2004 | Rimmer et al. | |
| 2004/0152601 A1 | 8/2004 | Still et al. | |
| 2004/0261993 A1 | 12/2004 | Nguyen | |
| 2004/0261995 A1 | 12/2004 | Nguyen et al. | |
| 2004/0261996 A1 | 12/2004 | Munoz, Jr. et al. | |
| 2004/0261999 A1 | 12/2004 | Nguyen | |
| 2005/0028976 A1 | 2/2005 | Nguyen | |
| 2005/0034861 A1 | 2/2005 | Saini et al. | |
| 2005/0034865 A1 | 2/2005 | Todd et al. | |
| 2005/0034868 A1 | 2/2005 | Frost et al. | |
| 2005/0103496 A1 | 5/2005 | Todd et al. | |
| 2005/0252659 A1 | 11/2005 | Sullivan et al. | |
| 2005/0272613 A1 | 12/2005 | Cooke, Jr. | |

FOREIGN PATENT DOCUMENTS

| | | |
|---|---|---|
| EP | 0 879 935 A3 | 10/1999 |
| EP | 1 413 710 A1 | 4/2004 |
| RU | 2 196 221 C2 | 1/2003 |
| RU | 2 199 226 C2 | 1/2003 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 03/027431 A2 | 4/2003 |
| WO | WO 03/027431 A3 | 4/2003 |
| WO | WO 04/037946 A1 | 5/2004 |
| WO | WO 04/038176 A1 | 5/2004 |
| WO | WO 2004/099101 A2 | 11/2004 |

OTHER PUBLICATIONS

Halliburton brochure entitled "Flocele Lost-Circulation Additive" dated 1999.

Halliburton brochure entitled "HR®-5 Cement Additive" dated 1998.

Halliburton brochure entitled "Latex 2000 Cement Additive" dated 1998.

Halliburton brochure entitled "Stabilizer 434B Latex Stabilizer" dated 1999.

Halliburton brochure entitled "Stabilizer 434C Surfactant" dated 1998.

Halliburton brochure entitled "Super CBL Additive" dated 1999.

U.S. Patent Application entitled "Emulsion Admixture For Improving Cement Elasticity", by B. Raghava Reddy et al., U.S. Appl. No. 10/767,672; filed Jan. 29, 2004.

Paper entitled "Advances in Polymer Science," by A.-C. Albertsson et al., pp. 1-138, dated 2002.

Halliburton brochure entitled "Halad-700® Fluid-Loss Additive" dated, [undated].

Simmons, et al., "Poly(phenyllactide): Synthesis, Characterization, and Hydrolytic Degradation," Biomacromolecules, vol.2, No. 3, 2001 (pp. 658-663).

Yin, et al., "Preparation and Characterization of Substituted Polylactides," Am. Chem. Soc., vol. 32, No. 23, 1999 (pp. 7711-7718).

Yin, et al., "Synthesis and Properties of Polymers Derived form Substituted Lactic Acids," Am. Chem. Soc., Ch. 12, 2001 (pp. 147-159).

Paper entitled "Controlled Ring-Opening Polymerization of Lactide and Glycolide" by Odile Dechy-Cabaret et al., dated 2004.

Cantu, et al., "Laboratory and Field Examination of a Combined Fluid-Loss Control Additive and Gel Breaker For Fracturing Fluids," SPE Paper 18211 (1990).

Paper entitled "A New Assay for the Enzymatic Degradation of Polylactic Acid" by Virun Vichaibun et al., dated 2003.

U.S. Appl. No. 10/650,101, filed Aug. 26, 2003, Todd et al.
U.S. Appl. No. 10/655,883, filed Sep. 5, 2003, Nguyen.
U.S. Appl. No. 10/661,173, filed Sep. 11, 2003, Todd et al.
U.S. Appl. No. 10/664,126, filed Sep. 17, 2003, Todd et al.
U.S. Appl. No. 10/736,152, filed Dec. 15, 2003, Todd.
U.S. Appl. No. 10/765,334, filed Jan. 27, 2004, Todd et al.
U.S. Appl. No. 10/768,323, filed Jan. 30, 2004, Roddy et al.
U.S. Appl. No. 10/768,864, filed Jan. 30, 2004, Roddy et al.
U.S. Appl. No. 10/769,490, filed Jan. 30, 2004, Roddy et al.
U.S. Appl. No. 10/783,207, filed Feb. 20, 2004, Surjaatmadja et al.
U.S. Appl. No. 10/785,300, filed Feb. 24, 2004, Frost et al.
U.S. Appl. No. 10/803,668, filed Mar. 17, 2004, Todd et al.

Todd, Brad et al., "A Chemical 'Trigger' Useful for Oilfield Applications" dated 2005, SPE 92709.

Cordes, E.H. et al., "Mechanism and Catalysis for Hydrolysis of Acetals, Ketals and Ortho Esters" dated 1973.

Foreign communication from a related counterpart application dated Sep. 21, 2005.

* cited by examiner

CEMENT COMPOSITIONS CONTAINING DEGRADABLE MATERIALS AND METHODS OF CEMENTING IN SUBTERRANEAN FORMATIONS

BACKGROUND

The present invention relates to methods and compositions for use in subterranean cementing operations. More particularly, the present invention relates to cement compositions comprising degradable materials, and methods of using such compositions in subterranean cementing operations.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into an annular space between the walls of a well bore and the exterior surface of a pipe string disposed therein. To ensure that the annular space is completely filled, a cement slurry is pumped into the annular space until the slurry circulates to the surface. The cement composition is then permitted to set in the annular space, thereby forming an annular sheath of hardened, substantially impermeable cement. The hardened cement substantially supports and positions the pipe string in the well bore and bonds the exterior surfaces of the pipe string to the walls of the well bore. Hydraulic cement compositions are also used in remedial cementing operations, such as plugging highly permeable zones or fractures in well bores, plugging cracks and holes in pipe strings, and the like.

Subterranean formations traversed by well bores naturally may be weak, extensively fractured, and highly permeable. In some cases, if the fracture gradient of the formation is exceeded by the hydrostatic head pressure normally associated with cement pumped into the well bore, the formation will fracture. This may result in the loss of cement into the extensive fractures of the formation. This can be problematic because, inter alia, less cement composition will remain in the annular space to form the protective sheath that bonds the pipe string to the walls of the well bore. Accordingly, loss of circulation of the cement slurry into the formation is of great concern.

Conventional attempts to solve the problem of lost circulation of cement slurries include adding polymeric flakes or film strips that may bridge the cracks and fractures in the formation and, thus, prevent the loss of the cement slurry. Examples of such materials include cellophane flakes, polypropylene flakes, or mica flakes, among others. However, the use of polypropylene flakes may be undesirable because the polymer is not biodegradable. Mineral flakes such as mica often have unsuitable sizes that preclude their use.

Conventional attempts to solve the problem of inadvertently fracturing the subterranean formation during cementing operations have also involved, inter alia, the use of cementing slurries with reduced densities. For example, cement slurry densities can be desirably reduced by incorporating an expanding additive, such as nitrogen, into the cement composition. Alternatively, lightweight particulate additives, such as hollow glass or ceramic beads, may be incorporated into the cement composition at the surface. However, these methods may be problematic because, inter alia, they can require elaborate and expensive equipment, which may not be accessible for use in remote areas.

Certain conventional cement compositions also may become brittle and/or inelastic at some point after setting into a cement sheath. This may be problematic because, inter alia, an excessively brittle or inelastic cement sheath may become unable to provide desired zonal isolation, and may require costly remediative operations. This may be particularly problematic in the case of multilateral wells. If the cement sheath in the area of the junction between a principal well bore and a lateral well bore in a multilateral well is excessively brittle or inelastic, it may be unable to withstand impacts that may occur, e.g., when tools used in drilling and completing the well collide with casing in the junction area as the tools are moved in and out of the well.

Well bores that comprise an expandable tubular present another scenario where an excessively brittle or inelastic cement sheath may be problematic. The expansion of an expandable tubular inadvertently may crush at least a portion of the cement sheath behind the tubular, thereby impairing the cement sheath's ability to provide the desired zonal isolation.

SUMMARY OF THE INVENTION

The present invention relates to methods and compositions for use in subterranean cementing operations. More particularly, the present invention relates to cement compositions comprising degradable materials, and methods of using such compositions in subterranean cementing operations.

An example of a method of the present invention is a method of cementing in a subterranean formation comprising: providing a cement composition comprising a hydraulic cement and a degradable material; placing the cement composition into a subterranean formation; allowing the cement composition to set therein; and allowing the degradable material to degrade.

Another example of a method of the present invention is a method of enhancing the mechanical properties of a cement composition comprising adding a degradable material to the cement composition and allowing the degradable material to degrade.

An example of a composition of the present invention is a cement composition comprising a hydraulic cement and a degradable material.

Other and further features and advantages of the present invention will be readily apparent to those skilled in the art upon a reading of the description of preferred embodiments which follows.

DESCRIPTION OF THE PREFERRED EMBODIMENTS

The present invention relates to methods and compositions for use in subterranean cementing operations. More particularly, the present invention relates to cement compositions comprising degradable materials, and methods of using such compositions in subterranean cementing operations. While the compositions and methods of the present invention are useful in a variety of subterranean applications, they are particularly useful in well completion and remedial operations, including primary cementing, e.g., cementing casings and liners in well bores, including those in multilateral subterranean wells.

The improved cement compositions of the present invention generally comprise: a hydraulic cement; at least one degradable material; and water sufficient to make the cement composition a slurry. Other additives suitable for use in conjunction with subterranean cementing operations also may be added to these compositions if desired. When the cement compositions of the present invention set, the resultant cement sheath may have improved mechanical properties that enhance the cement sheath's ability to sustain cyclic stresses due to temperature and pressure. The cement composition also may have improved thixotropic properties that may enhance its ability to handle loss of circulation and gas migration during the time in which it sets. In an exemplary embodiment of the present invention, degradation of the degradable material may be accompanied by formation of a new product, e.g., salts or gases, that may act as expanding additives that will enhance the shrinkage compensation properties and/or elasticity, of the resultant set cement.

Any cement may be utilized in the cement compositions of the present invention, including, but not limited to, hydraulic cements comprising calcium, aluminum, silicon, oxygen, and/or sulfur, which set and harden by reaction with water. Examples of suitable hydraulic cements are Portland cements, pozzolanic cements, gypsum cements, high alumina content cements, phosphate cements, silica cements, and high alkalinity cements. In certain exemplary embodiments of the present invention, API Portland Cement Classes A, G, and H are used.

The water used in the present invention may comprise fresh water, salt water (e.g., water containing one or more salts dissolved therein), brine (e.g., saturated salt water), or seawater. Generally, the water can be from any source provided that it does not contain an excess of compounds that may adversely affect other components in the cement composition. The water may be present in an amount sufficient to form a pumpable slurry. In certain exemplary embodiments, the water may be present in the cement compositions in an amount in the range of from about 25% to about 150% by weight of cement ("bwoc"). In certain exemplary embodiments, the water may be present in the cement compositions in the range of from about 30% to about 75% bwoc.

The cement compositions of the present invention comprise a degradable material. For example, the degradable material may be a polymeric material capable of degrading into sorbable components while in contact with the cement compositions of the present invention. The degradable material may be present in the cement compositions of the present invention in an amount sufficient to result, upon partial or complete degradation of the degradable material, in a resultant set cement having a desired density and desired mechanical properties (e.g., a desired Young's modulus and tensile strength). In certain exemplary embodiments of the present invention, the degradable material degrades after the cement composition has set in a subterranean formation. In certain other exemplary embodiments, the degradable material may degrade before or while the cement composition sets. In certain exemplary embodiments, the degradable material may be present in the cement compositions of the present invention in an amount in the range of from about 1% to about 25% bwoc. In certain exemplary embodiments, the degradable material may be present in the cement compositions of the present invention in an amount in the range of from about 5% to about 15% bwoc. In choosing the appropriate degradable material, one should consider the degradation products that will result. These degradation products should not adversely affect other operations, or properties of the set cement sheath. The choice of degradable material also can depend, at least in part, on the conditions of the well, e.g., well bore temperature.

Nonlimiting examples of degradable materials that may be used in conjunction with the present invention include, but are not limited to, degradable polymers. Such degradable polymers may be capable of undergoing an irreversible degradation downhole. In a further exemplary embodiment, the products of the degradation may be sorbable into the cement matrix. As referred to herein, the term "irreversible" will be understood to mean that the degradable material, once degraded downhole, should not reconstitute while downhole, e.g., the degradable material should degrade in situ but should not reconstitute in situ. The terms "degradation" or "degradable" refer to both the two relatively extreme cases of hydrolytic degradation that the degradable material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The degradability of a polymer depends at least in part on its structure. For instance, the presence of hydrolyzable and/or oxidizable linkages in the backbone often yields a material that will degrade as described herein. The rates at which such polymers degrade are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer degrades also may be affected by the environment to which the polymer is exposed, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157 entitled "Degradable Aliphatic Polyesters," edited by A.-C. Albertsson, pages 1–138. Examples of polyesters that may be used in accordance with the present invention include homopolymers, random, block, graft, and star- and hyper-branched aliphatic polyesters.

Another class of suitable degradable polymers that may be used in accordance with the present invention include polyamides and polyimides. Such polymers may comprise hydrolyzable groups in the polymer backbone that may hydrolyze under the basic conditions that exist in cement slurries and in a set cement matrix. Such polymers also may generate byproducts that may become sorbed into the cement matrix. Calcium salts are a nonlimiting example of such byproducts. Nonlimiting examples of suitable polyamides include proteins, polyaminoacids, nylon, and poly (caprolactam). Another class of polymers that may be suitable for use in the present invention are those polymers that may contain hydrolyzable groups, not in the polymer backbone, but as pendant groups. Hydrolysis of the pendant groups may generate a water-soluble polymer and other byproducts that may become sorbed into the cement composition. A nonlimiting example of such a polymer includes polyvinylacetate, which upon hydrolysis forms water-soluble polyvinylalcohol and acetate salts.

A variety of processes may be used to prepare the degradable polymers that are suitable for use in the cement compositions of the present invention. Examples of such processes include, but are not limited to, polycondensation reactions, ring-opening polymerizations, free radical polymerizations, anionic polymerizations, carbocationic polymerizations, coordinative ring-opening polymerizations, and any other appropriate process. Exemplary polymers that may be used in accordance with the present invention include, but are not limited to, aliphatic polyesters; poly(lactides); poly(glycolides); poly(ε-caprolactones); poly(hydroxybutyrates); poly(anhydrides); aliphatic poly(carbonates); ortho esters; poly(orthoesters); and poly(vinylacetates). In an exemplary embodiment of the present invention, the degradable material is poly(vinylacetate) in bead form, commercially available from Aldrich Chemical Company. In another exemplary embodiment of the present invention, the degradable material is poly(lactic acid), commercially available from Cargill Dow Polymers, LLC.

In certain exemplary embodiments, the rate of degradation of the polymer is such that the unhydrolyzed polymer additive retains its structure and shape until it may be suitable for an intended application. For example, it may be desirable for the polymers of the present invention to remain substantially insoluble (e.g., phase-separated) in the slurry until at least such time as the slurry is placed in a subterranean application. Furthermore, the rate of degradation of the degradable material may be varied depending on factors such as the hydraulic cement, the degradable material chosen, and the subterranean conditions of the application.

Generally, the degradable materials may be present in the cement composition in any shape, and may be of any size. In certain exemplary embodiments, the degradable materials may be spherical, substantially spherical, bead-shaped or fiber-shaped. In a further exemplary embodiment of the present invention, voids in the shape of the individual particles of the degradable material may form within the cement sheath.

In other embodiments, the rate of degradation of the degradable material may be such that a barrier may be formed by the degradable material to prevent slurry loss into a permeable zone (e.g., a zone comprising fractures). In a further exemplary embodiment, the barrier may remain without substantially degrading until the cement has set. In yet a further exemplary embodiment, the degradable material used to form the barrier may be flakes or film strips. Examples of such film-forming hydrolyzable polymers include, but are not limited to, polylactic acid, polyvinylacetate, and cellulose acetate. Such polymers also may have the additional advantage of being biodegradable.

In one exemplary embodiment of the present invention, the degradable material may enhance the properties of the cement composition by degrading to form reactive gases, (e.g., carbon dioxide, sulfur oxide, and the like), and/or by degrading to form salts. In a further embodiment, the degradable material may degrade to form gases that react with the cement composition to form an insoluble salt. In still a further embodiment, the gases produced may be inert, and may occupy the space formerly occupied by the degradable material.

Optionally, the cement compositions of the present invention may comprise a gas that is added at the surface (e.g., nitrogen) or a gas-generating additive that may generate a gas in situ at a desired time (e.g., aluminum powder or azodicarbonamide). When included in a cement composition of the present invention, aluminum powder may generate hydrogen gas in situ, and azodicarbonamide may generate nitrogen gas in situ. Other gases and/or gas-generating additives also may be suitable for inclusion in the cement compositions of the present invention. The inclusion of the gas or gas-generating additive in the cement compositions of the present invention may allow a cement composition to have "tunable" mechanical properties. For example, a cement composition of the present invention may be formulated to have a desired initial elasticity or flexibility through inclusion of a gas or gas-generating additive, which elasticity or flexibility then may change over time to a second desired value through degradation of the degradable material. An example of a suitable gas-generating additive is an aluminum powder that is commercially available from Halliburton Energy Services, Inc., of Duncan, Okla., under the tradename "SUPER CBL." SUPER CBL is available as a dry powder or as a liquid additive. Where included, a gas may be added at the surface to the cement compositions of the present invention in an amount sufficient to provide a gas concentration under downhole conditions in the range of from about 0.5% to about 30% by volume of the cement composition. Where included, a gas-generating additive may be present in the cement compositions of the present invention in an amount in the range of from about 0.1% to about 5% bwoc. In certain exemplary embodiments where the gas-generating additive is aluminum powder, the aluminum powder may be present in the cement compositions of the present invention in an amount in the range of from about 0.1% to about 1% bwoc. In certain exemplary embodiments where the gas-generating additive is an azodicarbonamide, the azodicarbonamide may be present in the cement compositions of the present invention in an amount in the range of from about 0.5% to about 5% bwoc. Where included, the gas or gas-generating additive may be added to the cement compositions in a variety of ways, including, but not limited to, dry blending it with the hollow particles, or injecting it into the cement composition as a liquid suspension while the cement composition is being placed within the subterranean formation.

Optionally, the cement compositions of the present invention may comprise a polymer emulsion comprising at least one polar monomer and at least one elasticity-enhancing monomer. In certain exemplary embodiments the polymer emulsion may further comprise a stiffness-enhancing monomer. As used herein, the term "polymer emulsion" will be understood to mean a water emulsion of a rubber or plastic obtained by polymerization. Such a polymer emulsion is commonly known as "latex," and the terms "polymer emulsion" and "latex" are interchangeable herein. Generally, the polar monomer may be selected from the group consisting of: vinylamine, vinyl acetate, acrylonitrile, and the acid, ester, amide, and salt forms of acrylates (e.g., acrylic acid). Generally, the elasticity-enhancing monomer may be selected from the group consisting of: ethylene, propylene, butadiene, 1,3-hexadiene, and isoprene. In certain exemplary embodiments that include a stiffness enhancing monomer, the stiffness enhancing monomer may be selected from the group consisting of: styrene, t-butylstyrene, α-methylstyrene, and sulfonated styrene. Generally, the polar monomer may be present in the polymer emulsion in an amount in the range of from about 1% to about 90% by weight of the polymer emulsion. Generally, the elasticity-enhancing monomer may be present in the polymer emulsion in an amount in the range of from about 10% to about 99% by weight of the polymer emulsion. When the polymer emulsion further comprises a stiffness-enhancing monomer, the stiffness-enhancing monomer may be present in the polymer emulsion in an amount in the range of from about 0.01% to about 70% by weight. Varying the amounts of the constituents of a latex may change the properties of the latex, so as to affect the type and degree of properties of the cement compositions of the present invention that optionally may include such latex. For example, when a latex having a high concentration of an elasticity-enhancing monomer (e.g., butadiene), is incorporated into a cement composition of the present invention, the elasticity-enhancing monomer may increase, inter alia, the elastomeric properties of the cement composition. For example, a latex having a high concentration of a stiffness-enhancing monomer (e.g., styrene), or a polar monomer (e.g., acrylonitrile), may decrease, inter alia, the elastomeric properties of the cement composition. Thus, one of ordinary skill in the art, with the benefit of this disclosure, will appreciate that the mechanical properties of a cement composition may be adjusted by varying the constituents of a polymer emulsion that may be incorporated in the cement composition. In certain exemplary embodiments, a polymer emulsion may be added to the cement compositions of the present invention by mixing the polymer emulsion with water, which then may be mixed with a hydraulic cement to form a cement composition. In certain exemplary embodiments, a polymer emulsion may be added to the cement compositions of the present invention by evaporating the water from a latex prepared as a water emulsion, thereby forming a dry polymer additive. The dry polymer additive then may be mixed with a hydraulic cement, which then may be mixed with water to form a cement composition. An example of a suitable polymer emulsion is an aqueous styrene butadiene latex that is commercially available from Halliburton Energy Services, Inc., of Duncan, Okla., under the tradename "LATEX 2000™." Where present, the polymer emulsion may be included within the cement composition in an amount in the range of from about 5% to about 100% by weight of the water therein. In certain exemplary embodiments, the cement composition that comprises a polymer emulsion further may comprise a surfactant, inter alia, to stabilize the polymer emulsion. In certain exemplary embodiments, the surfactant may be a nonionic ethoxylated nonylphenol. Examples of suitable surfactants are commercially available from Halliburton Energy Services, Inc., of Duncan, Okla., under the tradenames "STABILIZER 434 B" and "STABILIZER 434 C." Where included, the surfactant may be present in the cement composition in an amount in the range of from about 10% to about 20% by weight of the polymer emulsion.

Additional additives optionally may be added to the cement compositions of the present invention as deemed appropriate by one skilled in the art with the benefit of this disclosure. Examples of such additives include fluid loss control additives, defoamers, dispersing agents, set accelerators, salts, formation conditioning agents, weighting agents, set retarders, hollow glass or ceramic beads, elastomers, fibers and the like. An example of a suitable dispersing agent is commercially available from Halliburton Energy Services, Inc., of Duncan, Okla., under the tradename "CFR-3." An example of a suitable set retarder is a lignosulfonate that is commercially available from Halliburton Energy Services, Inc., of Duncan, Okla., under the tradename "HR®-5."

In certain exemplary embodiments, the cement compositions of the present invention may be prepared by dry blending the degradable materials with the cement before the addition of water, or by mixing the degradable materials with water before it is added to the cement, or by mixing the degradable materials with the cement slurry consecutively with or after the addition of water. In certain preferred embodiments, the degradable materials are dry blended with the cement before the addition of water. In other exemplary embodiments, the degradable materials may be pre-suspended in water and injected into the cement composition, or into the cement composition as an aqueous slurry, if desired.

An example of a method of the present invention comprises: providing a cement composition that comprises a hydraulic cement, and a degradable material; placing the cement composition in a subterranean formation, allowing the cement composition to set therein; and allowing the degradable material to degrade. In certain exemplary embodiments of the present invention, the subterranean formation may comprise a multilateral well. In certain exemplary embodiments of the present invention, the subterranean formation may comprise a well that comprises an expandable tubular. Another example of a method of the present invention is a method of enhancing the mechanical properties of a cement composition comprising adding a degradable material to the cement composition, and allowing the degradable material to degrade.

To facilitate a better understanding of the present invention, the following examples of some of the preferred embodiments are given. In no way should such examples be read to limit, or to define, the scope of the invention.

EXAMPLE 1

Sample cement compositions were prepared in accordance with API Recommended Practice 10B, Twenty-Second Edition, 1997.

Sample Composition No. 1 comprised Class A cement and about 37.85% water bwoc. Sample Composition No. 1 was cured for 1 day at a temperature of 210° F. and a pressure of 1000 psi.

Sample Composition No. 2 comprised Class A cement, about 8% bwoc polylactic acid ("PLA") in bead form (about 0.75 mm in diameter), and about 37.85% water bwoc. Sample Composition No. 2 was cured for 1 day at a temperature of 210° F. and a pressure of 1000 psi. The density of Sample Composition No. 2, upon setting, was measured at 16.4 lb/gallon.

Sample Composition No. 3 comprised Class A cement, PLA at about 8% bwoc and about 37.85% water bwoc. Sample Composition No. 3 was cured for 14 days at a temperature of 210° F. and a pressure of 1000 psi. The density of Sample Composition No. 3, upon setting, was measured at 16.3 lb/gallon.

The sample cement compositions were cured in 2"×2"×2" brass molds according to the API procedure for measuring compressive strengths using Tinius Olsen (TO) Instrument. The crushed samples were examined for the presence of bubble structure. The results of the testing are set forth in the table below.

TABLE 1

| Composition | Degradable material (% bwoc) | Compressive strength (psi) | Observed cement matrix morphology |
|---|---|---|---|
| Sample Composition No. 1 | None | 5290 | solid |
| Sample Composition No. 2 | PLA 8% bwoc | 2220 | Hollow bubbles |
| Sample Composition No. 3 | PLA 8% bwoc | 4780 | Hollow bubbles |

The above example demonstrates, inter alia, that the inclusion in a cement composition of degradable material in bead form contributes to the formation of voids upon degradation and sorption of the degradable material.

EXAMPLE 2

The Young's Modulus of Sample Composition Nos. 1 and 2 was determined after each Sample Composition had cured. The Young's Modulus was measured by performing Load vs. Displacement measurements on MTS Load Frame equipment under unconfining conditions. The results are set forth in Table 2.

TABLE 2

| Composition | Degradable material (% bwoc) | Young's Modulus (psi) |
|---|---|---|
| Sample Composition No. 1 | None | $2 \times 10^6$ |
| Sample Composition No. 2 | PLA 8% bwoc | $1.22 \times 10^6$ |

The above example demonstrates, inter alia, that the cement compositions of the present invention possess improved elasticity and resiliency.

EXAMPLE 3

Sample cement compositions were prepared that comprised Class A cement, about 0.375% bwoc CFR-3 dispersant, PLA at about 15% bwoc, and about 33.8% water bwoc. The sample cement compositions were cured for 3 days at a temperature of 190° F. and a pressure of 1000 psi.

Sample Composition No. 4 did not comprise a retarder.

Sample Composition No. 5 comprised about 0.5% bwoc HR®-5 retarder.

Sample Composition No. 6 comprised about 1.0% bwoc of HR®-5 retarder.

Thickening times at 190° F. were measured according to API procedure. The results of the testing are set forth in the table below.

TABLE 3

| Sample Composition | Retarder concentration (% bwoc) | Thickening Time (hrs:min) |
|---|---|---|
| Sample Composition No. 4 | 0 | 0:31 |
| Sample Composition No. 5 | 0.5 | 1:00 |
| Sample Composition No. 6 | 1.0 | 1:18 |

The above example suggests, inter alia, that the compositions of the present invention can be designed to set at a desired time.

EXAMPLE 4

Two sample compositions were prepared that comprised Class A cement, about 0.375% bwoc CFR-3 dispersing agent, about 15% PLA bwoc and about 33.8% water bwoc. Both sample compositions were cured at a temperature of 190° F. and a pressure of 1000 psi.

Sample Composition No. 7 cured for three days.

Sample Composition No. 8 cured for five days.

The compressive strength of each sample composition was measured according to the API procedure for measuring compressive strengths using Tinius Olsen (TO) Instrument. The results are set forth in the table below.

TABLE 4

| Composition | Cure time (days) | Compressive strength (psi) |
|---|---|---|
| Sample Composition No. 7 | 3 | 2890 |
| Sample Composition No. 8 | 5 | 3080 |

The above example demonstrates, inter alia, that the cement compositions of the present invention have suitable compressive strengths for, inter alia, oil well cementing.

EXAMPLE 5

Three sample cement compositions were prepared comprising Class A cement and about 37.85% water bwoc. The sample cement compositions were cured at a temperature of 210° F. and a pressure of 1000 psi.

Sample Composition No. 9 was formulated to have a design slurry density of 16.5 ppg. Sample Composition No. 9 comprised no degradable material, and was cured for 1 day.

Sample Composition No. 10 was formulated to have a design slurry density of 15.85 ppg. Sample Composition No. 10 comprised about 8% bwoc polyvinyl acetate in the bead form, and was cured for 1 day.

Sample Composition No. 11 was formulated to have a design slurry density of 15,85 ppg. Sample Composition No. 11 comprised about 8% bwoc polyvinyl acetate in the bead form, and was cured for 6 days.

TABLE 5

| Composition | Degradable Material (% bwoc) | Design Slurry Density (ppg) | Set Density (ppg) | Cure Time (days) | Compressive strength (psi) | Cement Matrix Morphology |
|---|---|---|---|---|---|---|
| Sample Composition No.9 | None | 16.5 | Not Determined | 1 day | 6230 | Solid |
| Sample Composition No. 10 | Polyvinyl acetate, 8% bwoc | 15.85 | 16.25 | 1 day | 3960 | Solid polymer beads |
| Sample | Polyvinyl | 15.85 | 16.21 | 6 days | 3770 | Hollow bubbles |

TABLE 5-continued

| Composition | Degradable Material (% bwoc) | Design Slurry Density (ppg) | Set Density (ppg) | Cure Time (days) | Compressive strength (psi) | Cement Matrix Morphology |
|---|---|---|---|---|---|---|
| Composition No. 11 | acetate, 8% bwoc | | | | | and polymer beads |

The above example demonstrates, inter alia, that the cement compositions of the present invention may be designed to have desired rates of degradation.

EXAMPLE 6

A 16.5 ppg slurry was prepared using Class H cement and 37.85% bwoc water. The slurry was divided into two portions of 300 ml each. A conventional lost-circulation material (FLOCELE flakes, available from Halliburton Energy Services, Inc., of Duncan, Okla.) was added to one portion in the amount of 0.2% bwoc. To the other portion, flakes of polylactic acid film having a thickness of 15–30 microns were added. Both portions were stirred for four hours at room temperature, and visually inspected for disappearance of the additive. In both cases, the flakes persisted without undergoing degradation. The above example demonstrates, inter alia, that degradable materials may be added to cement compositions in order to prevent loss of the cement composition to permeable zones in the formation, such as zones comprising fractures.

Therefore, the present invention is well adapted to carry out the objects and attain the ends and advantages mentioned as well as those that are inherent therein. While the invention has been described and is defined by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalence in all respects.

What is claimed is:

1. A method of cementing in a subterranean formation comprising:
    providing a cement composition comprising a hydraulic cement and a degradable material, wherein the degradable material is selected from the group consisting of aliphatic polyesters, poly(lactides), poly(glycolides), poly(ε-caprolactones), poly(hydroxybutyrates), poly(anhydrides), aliphatic polycarbonate, ortho esters, poly(orthoesters), poly(vinylacetates), polyamides, proteins, polyaminoacids, nylons, poly(caprolactams), polylactic acid, cellulose acetate, and combinations thereof;
    placing the cement composition into a subterranean formation;
    allowing the cement composition to set therein to form at least a portion of a cement sheath; and
    allowing the degradable material to degrade so as to create one or more voids within the cement sheath.

2. The method of claim 1 wherein the cement composition further comprises water, and wherein the water is present in the cement composition in an amount sufficient to form a pumpable slurry.

3. The method of claim 2 wherein the water is present in the cement composition in an amount in the range of from about 25% to about 150% by weight of the cement.

4. The method of claim 2 wherein the water is present in the cement composition in an amount in the range of from about 30% to about 75% by weight of the cement.

5. The method of claim 1 wherein the hydraulic cement is selected from the group consisting of Portland cements, pozzolanic cements, gypsum cements, high alumina content cements, phosphate cements, silica cements, and high alkalinity cements.

6. The method of claim 1 wherein the degradable material comprises a material that degrades at a desired time after contact with the cement composition.

7. The method of claim 1 wherein the degradable material comprises a material that prevents fluid loss into the subterranean formation.

8. The method of claim 1 wherein the degradable material degrades after the cement composition sets therein to form at least a portion of a cement sheath.

9. The method of claim 1 wherein the degradable material degrades before or while the cement composition sets therein to form at least a portion of a cement sheath.

10. The method of claim 1 wherein the degradable material, upon degradation, forms at least one gas, salt or combination thereof.

11. The method of claim 1 wherein the degradable material is selected from the group consisting of aliphatic polyesters, poly(lactides), poly(glycolides), poly(ε-caprolactones), poly(hydroxybutyrates), poly(anhydrides), aliphatic polycarbonate, ortho esters, poly(orthoesters), poly(vinylacetates), and combinations thereof.

12. The method of claim 1 wherein the degradable material comprises a polyamide.

13. The method of claim 1 wherein the degradable material is selected from the group consisting of proteins, polyaminoacids, nylons, poly(caprolactams), and combinations thereof.

14. The method of claim 1, wherein the degradable material is selected from the group consisting of polylactic acid, cellulose acetate, and a combination thereof.

15. The method of claim 1 wherein the cement composition further comprises an additive selected from the group consisting of fluid loss control additives, defoamers, dispersing agents, set accelerators, salts, formation conditioning agents, weighting agents, set retarders, glass beads, ceramic beads, elastomers, and combinations thereof.

16. The method of claim 1 wherein the degradable material comprises particles in the form of a thin film, a flake, a substantially spherical particle, a bead, a fiber, or a combination thereof.

17. The method of claim 1 wherein the degradable material is present in the cement composition in an amount sufficient to leave voids in the cement composition that enhance the mechanical properties of the cement composition.

18. The method of claim 17 wherein the properties that are enhanced include the elasticity, resiliency, and/or ductility of the portion of the set cement sheath.

19. The method of claim 1 wherein the degradable material is present in the cement composition in an amount in the range of from about 1% to about 25% by weight of cement.

20. The method of claim 1 wherein the degradable material is present in the cement composition in an amount in the range of from about 5% to about 15% by weight of cement.

21. The method of claim 1 wherein the cement composition further comprises a polymer emulsion.

22. The method of claim 21, wherein the polymer emulsion is present in the cement composition in an amount in the range of from about 5% to about 100% by weight of an amount of water in the cement composition.

23. The method of claim 21 wherein the polymer emulsion comprises a polar monomer and at least one elasticity-enhancing monomer.

24. The method of claim 23 wherein the polar monomer is selected from the group consisting of vinylamine, vinyl acetate, acrylonitrile, and the acid, ester, amide, and salt forms of acrylates.

25. The method of claim 23 wherein the at least one elasticity-enhancing monomer is selected from the group consisting of ethylene, propylene, butadiene, 1,3-hexadiene, and isoprene.

26. The method of claim 25 wherein the stiffness-enhancing monomer is selected from the group consisting of styrene, t-butylstyrene, α-methylstyrene, and sulfonated styrene.

27. The method of claim 23 wherein the polar monomer is present in the polymer emulsion in an amount in the range of from about 1% to about 90% by weight of the polymer emulsion.

28. The method of claim 23 wherein the at least one elasticity-enhancing monomer is present in the polymer emulsion in an amount in the range of from about 10% to about 99% by weight of the polymer emulsion.

29. The method of claim 23 wherein the polymer emulsion further comprises a stiffness-enhancing monomer.

30. The method of claim 28 wherein the stiffness-enhancing monomer is present in the polymer emulsion in an amount in the range of from about 0.01% to about 70% by weight of the polymer emulsion.

31. The method of claim 21 wherein the polymer emulsion comprises an aqueous styrene butadiene latex.

32. The method of claim 21 wherein the cement composition further comprises a surfactant.

33. The method of claim 32 wherein the surfactant comprises a nonionic ethoxylated nonylphenol.

34. The method of claim 32 wherein the surfactant is present in the cement composition in an amount in the range of from about 10% to about 20% by weight of the polymer emulsion.

35. The method of claim 1 wherein the cement composition comprises a gas.

36. The method of claim 35 wherein the gas is nitrogen.

37. The method of claim 36 wherein the gas is present in the cement composition in an amount sufficient to provide a gas concentration in the range of from about 0.5% to about 30% by volume of the cement composition, measured when the cement composition has been placed in the subterranean formation.

38. The method of claim 1 wherein the cement composition comprises a gas-generating additive.

39. The method of claim 38 wherein the gas-generating additive is selected from the group consisting of aluminum powder and azodicarbonamide.

40. The method of claim 39 wherein the aluminum powder is present in the cement composition in an amount in the range of from about 0.1% to about 1% by weight of the cement.

41. The method of claim 39 wherein the azodicarbonamide is present in the cement composition in an amount in the range of from about 0.5% to about 5% by weight of the cement.

42. The method of claim 38 wherein the gas-generating additive is capable of generating hydrogen or nitrogen in situ.

43. The method of claim 38 wherein the gas-generating additive is present in the cement composition in an amount in the range of from about 0.1% to about 5% by weight of the cement.

44. The method of claim 1 wherein the subterranean formation comprises a multilateral well.

45. The method of claim 1 wherein the subterranean formation comprises a well bore that comprises an expandable tubular.

46. The method of claim 1, wherein the cement is a Portland cement; wherein the degradable material is polylactic acid, wherein the polylactic acid is present in the cement composition in an amount in the range of about 1% to about 25% by weight of the cement; wherein the cement composition further comprises water, and wherein the water is present in the cement composition in an amount in the range of from about 25% to about 150% by weight of the cement.

* * * * *